March 10, 1964　　P. L. HILLIARD　　3,123,938
PLANT PROTECTOR

Filed Jan. 2, 1962　　　　　　　　2 Sheets-Sheet 1

Palmer L. Hilliard
INVENTOR.

BY *Clarence A. O'Brien*
*and Harvey B. Jacobson*
Attorneys

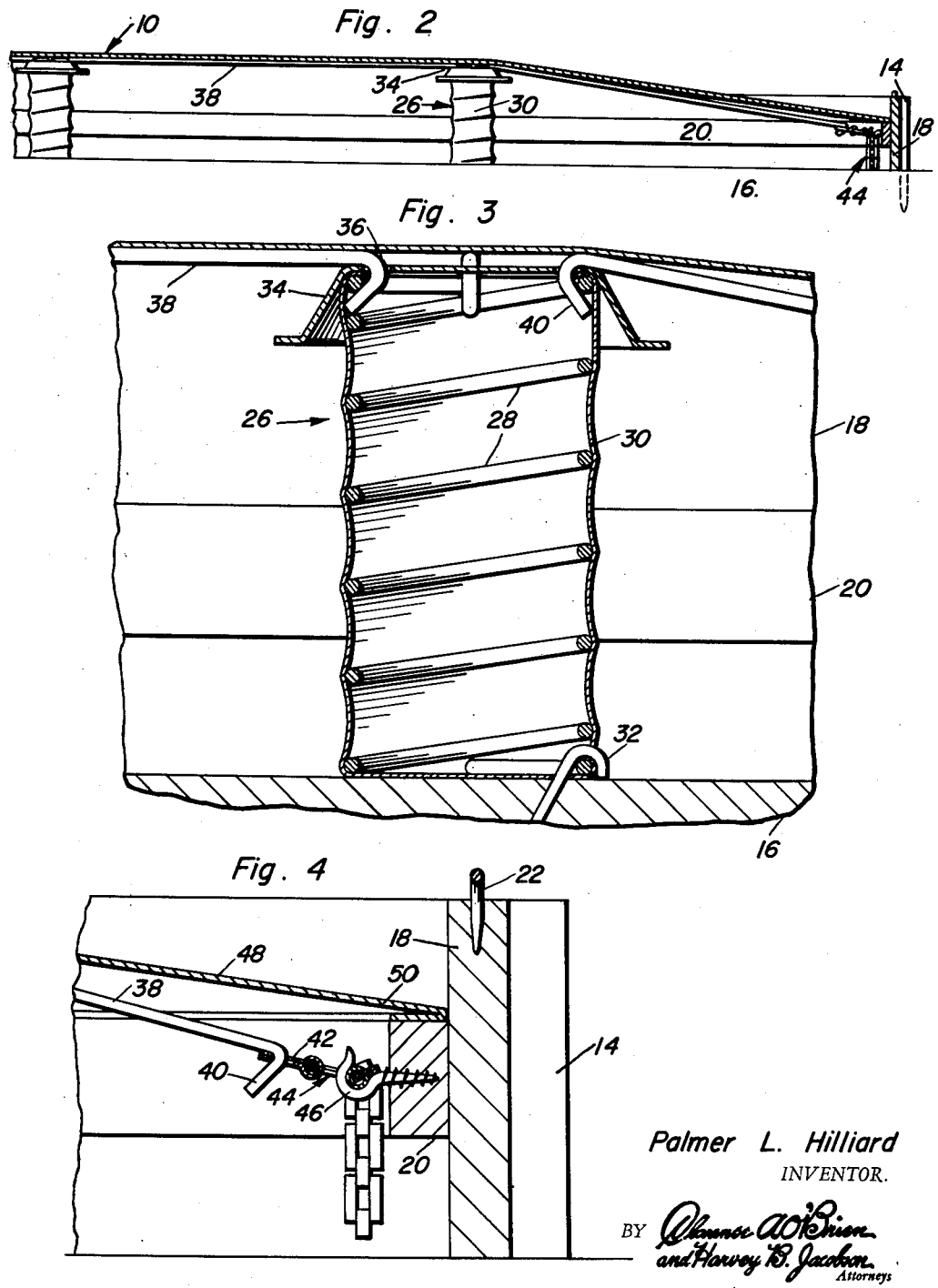

United States Patent Office 3,123,938
Patented Mar. 10, 1964

3,123,938
PLANT PROTECTOR
Palmer L. Hilliard, Rte. 1, Kittrell, N.C.
Filed Jan. 2, 1962, Ser. No. 163,723
7 Claims. (Cl. 47—28)

The present invention relates to a plant bed protector, and more particularly to a plant bed protector for sheltering tobacco plant beds wherein said protector is constructed in such a manner so as to prevent damage to an exterior cover forming a portion thereof.

An object of the present invention is to provide a plant bed protector capable of covering a plant bed while preventing the cover from touching and sticking to the plants or the bed.

Another object is to provide a protector which will not mash, damage, or disturb the bed.

A further object is to prevent wear and tear on the cover brought about by said cover sticking to the plants.

An additional object of the present invention is the provision of a cover for a plant bed capable of returning to its normal height upon the removal of any outside load imposed thereon such as for example snow or ice.

Also, an important object of the present invention is the provision of a plant bed protector which eliminates wind damage to the plants and cover while allowing movement of the cover in response to outside wind pressure.

Likewise, it is an object of the present invention to provide a plant bed protector which eliminates many of the disadvantages of conventional protectors.

Furthermore, an additional object is the provision of a plant bed protector which is economically and readily erected, and easily repaired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a sectional view taken substantially on line 2—2 of FIG. 1;

FIG. 3 is an enlarged sectional view taken substantially on line 3—3 of FIG. 1 and showing a support member anchored to the bed and cross wires secured to the upper portion of said support member;

FIG. 4 is a section through the frame illustrating the location of the canvas in respect to the frame and the manner of securing the cross wires to the frame, one of the aligning means is also shown secured to the top edge of the frame.

Figure 1:
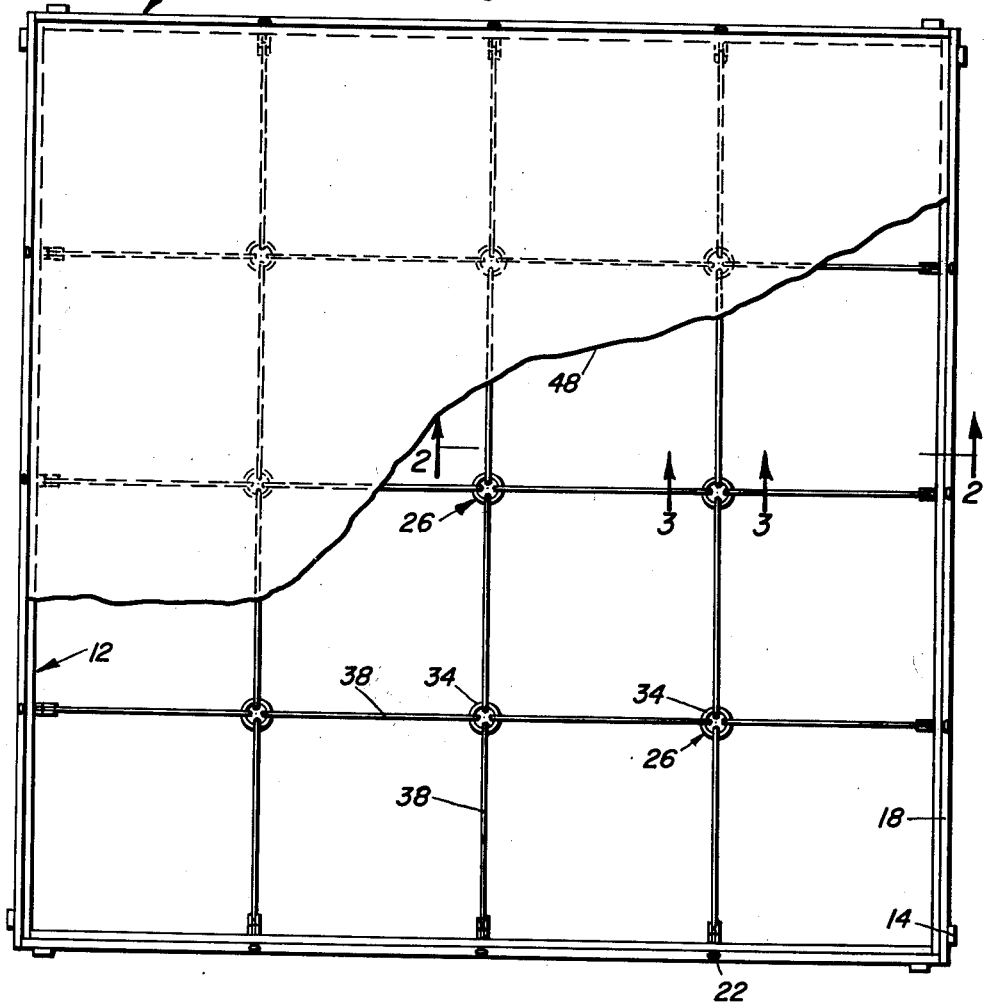
FIG. 1 is a top plan view of the plant bed protector with a portion of the cover broken away so as to show the supporting structure.

Referring now more particularly to the drawings, reference numeral 10 generally designates the plant bed protector comprising the present invention. Such beds are typically 25 yard beds and contain nine supports as shown in FIG. 1, however, as is readily apparent any size bed can be protected, and the number of supports varied accordingly. The plant bed protector includes a frame 12 comprising, as best seen in FIGS. 2 and 4 a plurality of stakes 14 adapted to be driven into the ground 16, horizontal upright planks 18 secured to stakes 14 in any conventional manner, and boards or strips 20 narrower than planks 18 and secured thereto on the side of said planks opposite from the stakes 14. Said boards being positioned approximately equidistant between the upper and lower edges of plank 18.

Secured to the top edge of plank 18 and spaced peripherally around the frame 12 are aligning means 22. Said aligning means preferably being staples, however, other means such as nails or notches can also be used. The conventional manner of positioning said staples 22 is shown in FIGURE 1 however, the invention herein set forth is not necessarily limited to the specific arrangement shown in FIGURE 1.

Figure 5:
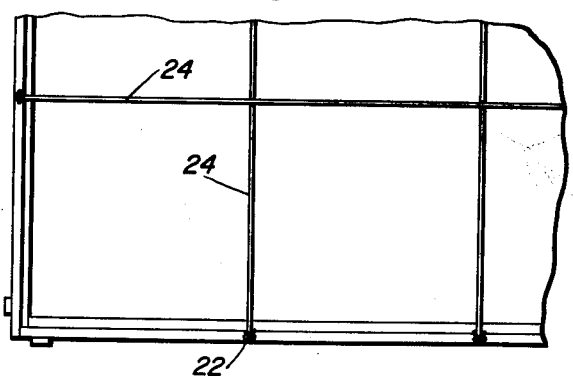
FIG. 5 is a partial plan view of the frame provided with aligning cords secured to aligning means on said frame.

With reference to FIGURES 5 and 1 it will be noted that the aligning means 22 are used to secure aligning cords or wires 24, the intersection of said cords 24 denoting the location of supporting members 26.

The supporting members 26 consist essentially of upright spring-like members 28, the coils of which are spaced so as to allow for both expansion and contraction. Each supporting member 26 further includes a bag-like enclosure for the springs 28 to prevent the plants from growing into the springs and to prevent damage to the bed upon removal of said springs, said bag-like member being of any flexible material such as cloth or canvas. An anchor member 32 is engaged with the bottom of the supporting member 26 and inserted into the ground 16 so as to secure said supporting member in an upright position.

Carried by the top of each supporting member 26 is a cap member 34, the cap member having a smooth upper surface containing a plurality of apertures 36 therein, said apertures being preferably four in number.

As best seen in FIGURE 1, wires 38 extend from supporting member 26 to supporting member 26 and from supporting member 26 to the frame 12 substantially along lines which correspond to the lines of the aligning cords 24 used to locate the supporting members 26. Each wire 38 extends only between two members, thus allowing for easy replacement in the event of a failure of one of the wires. The ends of each of the rods 38 is reversely bent so as to form a hook 40 as best shown in FIGURES 3 and 4, such hooks preferably being approximately 45 degrees, but not necessarily limited thereto. The ends of the wires 38 adjacent the support members 26, are secured thereto by insertion of the hooks 40 through the apertures 36 in the cap member 34.

The end of the wires 38 supported by the frame 12 are secured thereto by insertion of the hook 40 through a link 42 of a chain 44. The opposite end of said chain 44 being attached to the board 20 by engagement of one of said links 42 with a hook member 46 secured to said board member 20. The use of such a link chain connection allows for the maintenance of the wires 38 in relatively taut condition by simply selecting the desired link 42.

Over the entire area enclosed by the frame member 12 is a cover member 48, preferably of canvas, but not necessarily limited thereto, supported at its edges 50 on the upper surface of the boards 20 and secured thereto by any conventional means such as tacking. As seen in FIGURE 4, the edges 50 of said cover member 48 are positioned below the upper edge of the plank 18 thus preventing the lifting of said edges 50 by the wind. The intermediate portions of said cover member are supported upon the plurality of supporting members 26 as well as the crossed network of wires.

The protector is usually installed at the time of sowing as the bed can be walked on at that time without causing damage to the bed or plants. The plant bed protector 10 is erected by first locating the frame 12 around the bed with the stakes 14 driven into the ground so as to enable the bottom edge of the plank 18 to contact the ground. Next, aligning cords 24 are secured between the aligning means 22 and supporting members 26 are located at the intersection of said aligning cords and anchored in an upright position by anchor members 32.

Thirdly, the wires 38 are secured in position by engagement of the hooks 40 with both the apertures 36 in caps 34 and the links 42 in chains 44 which are secured to the boards 20. Finally, the cover 48 is positioned over the supporting members 26 and wires 38, and the ends 50 of said cover member 48 are then secured in a conventional manner to the upper surface of the boards 20. The protector 10 is dismantled by reversing the above steps, and when dismantled, can easily and readily be stored away in a comparatively small place for further use. As is readily apparent, the disclosed plant bed protector 10 can be assembled and disassembled for future use many times without destroying the effectiveness of said protector. It is noted that applicant's invention is not limited to the method of installation set forth supra inasmuch as other methods equally as effective could be employed.

It is of course desirable to provide that all of the materials used in the above described invention be rustproof either by galvanizing or painting or by the use of a material which is in itself non-rusting such as aluminum.

While the use of planks 18 has been specifically described, it is obvious that readily available material such as poles or logs could be substituted for the planks and still be within the scope of the invention.

From the foregoing it is apparent that a novel structure has been defined which protects the tobacco plants from external forces such as wind and snow while not interfering with the growing plants. The unique advantages of the structure are brought about by the use of a ground engaging frame with the cover secured below the upper edge thereof so as to exclude wind from the bed for protection of both the bed and the cover. A further advantage is the provision of the novelly different spring support members enabling the cover to always return to its normal position after deformation from outside forces. Additionally, the formation of the supporting mesh by the use of a plurality of standard members allows for easy erection and replacement of parts and compact storage of the disassembled structure. Moreover, the provision of a bag-like member around the springs so as to prevent entanglement of the plants, as well as the use of adjustable link chains to secure the wires to the boards are features resulting in heretofore unknown advantages.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plant bed protector comprising a plurality of rows of spaced upright, flexible and resilient supports, said spaced supports in each row being aligned with the spaced supports in every other row, a set of wires extending along said rows and between and supported in a relatively taut manner on the upper portion of the supports in each row, a second set of wires perpendicular to said first mentioned wires and extending between and supported in a relatively taut manner on the upper portion of the aligned supports, a cover supported on said wires, each of said wires being of a length so as to extend between adjacent supports and having means on the ends thereof for releasable engagement with said adjacent supports, a frame surrounding said supports and spaced therefrom, and adjustable means securing the outer ends of said sets of wires to said frame, said supports comprising upstanding ground-engaging springs capable of expansion and contraction, and a plurality of anchor members engaged with a plurality of said springs and depending therefrom for piercing engagement with the ground.

2. The structure as defined in claim 1 wherein each spring support is provided with a bag-like cover so as to prevent entanglement of the plants in said spring support.

3. The structure as defined in claim 2 wherein each spring is additionally provided with a cap presenting a smooth upper surface so as to prevent damage to the superimposed cover.

4. A plant bed protector comprising a plurality of spaced upright resilient supports, said supports being aligned in both longitudinal and transverse rows, a rigid peripheral frame surrounding said supports, a plurality of elongated longitudinally and traversely aligned wires interconnecting said supports, each wire extending solely between two of said supports and having means on both ends thereof for releasable engagement with the supports, means releasably and adjustably engaged between the outermost support in each row and the frame for varying the tension in said wires, said frame consisting of wind impervious members extending upwardly from the ground in a wind excluding manner, and a cover supported on said wires and having the peripheral edges secured to the inner face of said frame below the upper edge thereof in a manner so as to prevent the entry of wind, said supports consisting of upright expanded coil springs, each of said coil springs being provided with a cap presenting a smooth upper surface so as to prevent damage to the superimposed cover, and a bag-like enclosure so as to prevent entanglement of the plants.

5. The structure of claim 4 wherein the caps are provided with peripherally spaced apertures therethrough and the means on the ends of the wires consist of reversely bent hooks insertable through said apertures.

6. A plant bed protector comprising a plurality of spaced upright resilient supports, said supports being aligned in both longitudinal and transverse rows, a rigid peripheral frame surrounding said supports, a plurality of elongated longitudinally and transversely aligned wires interconnecting said supports, means releasably and adjustably engaged between the outermost support in each row and the frame for varying the tension in said wires, said frame consisting of wind impervious members extending upwardly from the ground in a wind excluding manner, and a cover supported on said wires and having the peripheral edges secured to the outer face of said frame below the upper edge thereof in a manner so as to prevent entry of wind, said supports consisting of upright expanded coil springs.

7. The structure of claim 6 including a cap positioned on the upper end of each coil spring, each cap being provided with peripherally spaced apertures therethrough, each of said wires extending solely between two of said supports and having reversely bent opposite ends releasably engaged through the corresponding cap apertures.

References Cited in the file of this patent

UNITED STATES PATENTS

| | | |
|---|---|---|
| 210,000 | Yeoman | Nov. 19, 1878 |
| 727,541 | Hayes | May 5, 1903 |
| 751,713 | Berry et al. | Feb. 9, 1904 |
| 890,967 | Davey et al. | June 16, 1908 |
| 1,010,667 | Mnuskin | Dec. 5, 1911 |
| 2,251,624 | Foree et al. | Aug. 5, 1941 |
| 2,567,520 | McInerney et al. | Sept. 11, 1951 |
| 2,595,072 | Gottschalk | Apr. 29, 1952 |